US009406332B2

(12) United States Patent
Mochizuki et al.

(10) Patent No.: US 9,406,332 B2
(45) Date of Patent: Aug. 2, 2016

(54) OPTICAL INFORMATION RECORDING MEDIUM

(71) Applicant: FUJIFILM CORPORATION, Tokyo (JP)

(72) Inventors: Hidehiro Mochizuki, Odawara (JP); Tetsuya Watanabe, Haibara-gun (JP); Toshio Sasaki, Odawara (JP); Tatsuo Mikami, Odawara (JP); Takumi Nakamura, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/845,492

(22) Filed: Sep. 4, 2015

(65) Prior Publication Data

US 2015/0380042 A1 Dec. 31, 2015

Related U.S. Application Data

(63) Continuation of application No. PCT/JP2014/051305, filed on Jan. 22, 2014.

(30) Foreign Application Priority Data

Mar. 8, 2013 (JP) ................................ 2013-046153

(51) Int. Cl.
*G11B 7/24* (2013.01)
*G11B 7/246* (2013.01)
*G11B 7/24038* (2013.01)
(Continued)

(52) U.S. Cl.
CPC .............. *G11B 7/246* (2013.01); *C08F 220/18* (2013.01); *C08F 226/06* (2013.01); *G11B 7/245* (2013.01); *G11B 7/24038* (2013.01); *G11B 7/2405* (2013.01); *G11B 7/256* (2013.01)

(58) Field of Classification Search
CPC ..... G11B 7/245; G11B 7/246; G11B 7/24038; G11B 7/00452; C08F 220/18; C08F 226/06
See application file for complete search history.

(56) References Cited

U.S. PATENT DOCUMENTS 4,719,615 A 1/1988 Feyrer et al.
4,852,075 A 7/1989 Feyrer et al.
(Continued)

FOREIGN PATENT DOCUMENTS

JP 7-118090 B2 12/1995
JP 2771231 B2 7/1998
JP 2012-89195 A 5/2012

OTHER PUBLICATIONS

Wim P. De Boeji, et al., "System-Bath Correlation Function Probed by Conventional and Time-Gated Stimulated Photon Echo", J. Phys. Chem. 1996, 11806-11823, vol. 100, No. 29.
(Continued)

*Primary Examiner* — Elizabeth Mulvaney
(74) *Attorney, Agent, or Firm* — Sughrue Mion, PLLC

(57) ABSTRACT

An optical information recording medium includes at least one recording layer. The recording layer includes a recording material comprising a polymer compound to which a one-photon absorption dye is bonded, and a coupling strength $\Delta^2$ between the one-photon absorption dye and the polymer compound in the recording material is higher than a coupling strength estimated to be exerted between the same one-photon absorption dye and the same polymer compound if the one-photon absorption dye is dispersed in the polymer compound in the recording material.

11 Claims, 5 Drawing Sheets

(51) Int. Cl.
*G11B 7/245* (2006.01)
*C08F 220/18* (2006.01)
*C08F 226/06* (2006.01)
*G11B 7/2405* (2013.01)
*G11B 7/256* (2006.01)

(56) References Cited

U.S. PATENT DOCUMENTS

| | | | |
|---|---|---|---|
| 4,912,696 A | 3/1990 | Feyrer et al. | |
| 5,215,800 A | 6/1993 | Daido et al. | |
| 2013/0100791 A1* | 4/2013 | Mochizuki | B82Y 10/00 369/83 |
| 2013/0121127 A1* | 5/2013 | Kitahara | B82Y 10/00 369/275.1 |
| 2013/0128710 A1* | 5/2013 | Mochizuki | B82Y 10/00 369/100 |
| 2013/0128715 A1* | 5/2013 | Kitahara | B82Y 10/00 369/275.1 |
| 2013/0189494 A1* | 7/2013 | Mikami | G11B 7/24027 428/172 |
| 2013/0229901 A1 | 9/2013 | Mochizuki et al. | |
| 2014/0023816 A1* | 1/2014 | Kitahara | G11B 7/00452 428/64.9 |
| 2014/0029403 A1* | 1/2014 | Mochizuki | G11B 7/245 369/100 |
| 2014/0120295 A1* | 5/2014 | Mochizuki | G11B 7/256 428/41.8 |

OTHER PUBLICATIONS

Sean A. Passino, et al., "Three-Pulse Echo Peak Shift Studies of Polar Solvation Dynamics", J. Phys. Chem. A 1997, 725-731, vol. 101, No. 4.
International Search Report of PCT/JP2014/051305, dated Apr. 8, 2014. [PCT/ISA/210].
Written Opinion of PCT/JP2014/051305, dated Apr. 8, 2014. [PCT/ISA/237].

* cited by examiner

FIG.5

| COVER LAYER | 67 μm |
|---|---|
| SECOND INTERMEDIATE LAYER | 20 μm |
| RECORDING LAYER | 1 μm |
| FIRST INTERMEDIATE LAYER | 20 μm |
| SUBSTRATE | 1mm |

FIG. 6

| | Recording layer 1 | Coupling strength $\Delta^2$ [$\times 10^5$ cm$^{-2}$] | Number of atoms involved in coupling | Recording power [mW] | Enhanced sensitivity due to coupling | Storage property |
|---|---|---|---|---|---|---|
| Example 1 | Compound A | 7 | 3 | 11 | Observed | Good |
| Comparative Example 1 | Compound B /PBMA | 6 | — | 15 | — | Not good |
| Example 2 | Compound C | 4 | 0 | 23 | Observed | Good |
| Comparative Example 2 | Compound D /PBMA | 3 | — | 33 | — | Not good |
| Comparative Example 3 | Compound E | 15 | 10 | 14 | Unobserved | Good |
| Comparative Example 4 | Compound F /PBMA | 15 | — | 14 | — | Not good |

OPTICAL INFORMATION RECORDING MEDIUM

CROSS-REFERENCE TO RELATED APPLICATION(S)

This application is a continuation application of International Application No. PCT/JP2014/051305 filed on Jan. 22, 2014, which claims priority to Japanese Patent Application No. 2013-046153 filed on Mar. 8, 2013, the disclosures of which are incorporated herein by reference in their entireties.

TECHNICAL FIELD

The present invention relates to an optical information recording medium comprising a recording layer including a polymer compound.

BACKGROUND ART

As an optical information recording medium comprising recording layers and intermediate layers, for example, Patent Literature 1 to Patent Literature 3 disclose recording media each comprising a recording layer including a polymer compound (polymer binder) and a dye dispersed in the polymer binder. The Patent Literature 1 teaches an optical information recording medium comprising a large number of recording layers each of which preferably includes a multi-photon absorption dye in order to minimize influence on an adjacent recording layer at the time of recording and reading information.

CITATION LIST

Patent Literature

Patent Literature 1: Japanese laid-open patent application publication No. 2012-89195
Patent Literature 2: Japanese patent No. 2101521
Patent Literature 3: Japanese Patent No. 2771231

SUMMARY OF THE INVENTION

The dye dispersed in the polymer binder in the recording layer may disadvantageously spread into an adjacent layer such as an intermediate layer with the lapse of time. If the dye spreads into the intermediate layer, reflection of light would become unlikely to occur at the interface, for example, between the recording layer and the intermediate layer, so that the performance for recording and/or reading information may be degraded. Therefore, the optical information recording medium in which the dye is dispersed in the recording layers may suffer from a problem in stability, e.g., for preserving the properties during a long-term storage.

Further, in the case where the recording layer contains a multi-photon absorption dye, an ultrashort-pulse laser with a large peak power is required for recording information. This leads to a problem such as an increase in the cost of an optical recording apparatus. It is therefore desirable to provide an optical information recording medium in which a laser having a small peak power, such as a semiconductor laser, as used for a conventional optical recording can be used for recording. Further, in order to increase the recording speed, it is also desirable to provide an optical information recording medium in which a recording sensitivity of a recording material is as high as possible.

In view of the above, it is an object of the present invention to provide an optical information recording medium which excels in long-term stability and in which information can be recorded using a laser having a small peak power.

In order to achieve the aforementioned object, the present invention provides an optical information recording medium comprising at least one recording layer, wherein the recording layer includes a recording material comprising a polymer compound to which a one-photon absorption dye is bonded. A coupling strength $\Delta^2$ between the one-photon absorption dye and the polymer compound in the recording material is higher than a coupling strength estimated to be exerted between the same one-photon absorption dye and the same polymer compound if the one-photon absorption dye is dispersed in the polymer compound in the recording material.

With this configuration, since the recording material comprises a polymer compound to which a one-photon absorption dye is bonded, it is possible to suppress spreading of the dye into an adjacent layer such as an intermediate layer. This can improve the long-term stability of the optical information recording medium. Further, since a one-photon absorption dye is used as the dye, information can be recorded using a laser having a small peak power. Further, since a coupling strength between the one-photon absorption dye and the polymer compound in the recording material is higher than a coupling strength estimated to be exerted between the same one-photon absorption dye and the same polymer compound if the one-photon absorption dye is dispersed in the polymer compound in the recording material, a favorable optical information recording medium with a higher recording sensitivity can be obtained.

In the above-described optical information recording medium, it is preferable that the number of atoms involved in bonding of the one-photon absorption dye to the polymer compound is less than 10.

With this configuration, an excellent recording sensitivity can be obtained.

In the above-described optical information recording medium, an intermediate layer may be provided between two adjacent recording layers.

In other words, the present invention is applicable to an optical information recording medium having multiple recording layers. As the recording material according to the present invention has an excellent sensitivity even if a one-photon absorption dye is used, information can be recorded irrespective of a lower absorptance of the recording layer (i.e., a higher transmittance). This can provide a large number of recording layers and thus ensure a large storage capacity.

In this optical information recording medium having multiple recording layers, each recording layer may have a first interface and a second interface between the recording layer and two intermediate layers sandwiching the recording layer, and at least one of the first and second interfaces is configured to have a protrusion formed by irradiation with a recording beam; the protrusion sticks out into one of the intermediate layers.

In the optical information recording medium in which information is recordable by this protrusion, a thickness of the recording layer is equal to or greater than 50 nm.

With this configuration in which the thickness of the recording layer may be equal to or greater than 50 nm, the protrusion can be easily formed.

In the optical information recording medium in which information is recordable by the protrusion, it is preferable that the intermediate layer forming the interface in which the protrusion is formed is softer than the recording layer. Since the intermediate layer forming the interface in which the protrusion is formed is softer than the recording layer, the interface can be easily deformed so that the recording of information by the protrusion can be easily performed. To compare the hardnesses of the recording layer and the intermediate layer, the materials used for forming the recording layer and the intermediate layer are pressed to each other. To be more specific, when the materials are pressed to each other, it can be checked that the softer one will be recessed more deeply than the harder one.

In the optical information recording medium in which information is recordable by the protrusion, a glass transition temperature of the intermediate layer forming the interface in which the protrusion is formed may be lower than a glass transition temperature of the recording layer. Also with this configuration, the intermediate layer forming the interface in which the protrusion is formed is deformed more easily than the recording layer, and the recording of information by the protrusion can be easily performed.

In the optical information recording medium in which information is recordable by the protrusion, the intermediate layer forming the interface in which the protrusion is formed may be an adhesive agent layer by way of example.

Further, in the optical information recording medium in which information is recordable by the protrusion, the protrusion may be formed in one of the first interface and the second interface by irradiation with the recording beam, and the protrusion may not be formed in the other one of the first interface and the second interface, and it is preferable that a difference between refractive indices of the intermediate layer and the recording layer is greater at the interface in which the protrusions is formed than at the interface in which the protrusion is not formed.

With this configuration, the interface in which the protrusion is formed is used for reading the information; for this purpose, it is preferable that the difference between refractive indices of the materials is large at both sides of this interface so that the interface reflectivity becomes relatively large and thus reading of the information can be performed easily. In contrast, the interface in which the protrusion is not formed is not used for reading the information; for this reason, it is preferable that the transmittance for a light beam used for recording or reading information (hereinafter referred to as a "recording/reading beam") (i.e., the total transmittance of the first interface and the second interface) can be increased. Accordingly, in the case of a multi-layered recording medium, the light beam can reach far deeper recording layers from the recording/reading beam radiation side. This is advantageous for increasing the storage capacity by increasing the number of recording layers.

Further, in this configuration of the optical information recording medium, it is preferable that the difference between the refractive index of the intermediate layer forming the interface in which the protrusion is not formed and the refractive index of the recording layer is equal to or smaller than 0.05.

With this configuration, since the light reflectivity of this interface is substantially zero, in the case of multi-layered recording layers, the light beam can reach far deeper recording layers from the recording/reading beam radiation side. This is advantageous for increasing the storage capacity by increasing the number of recording layers.

BRIEF DESCRIPTION OF THE DRAWINGS

FIG. 5 is a diagram illustrating a layer structure formed by experiments.

FIG. 6 is a table showing the results of the experiments.

DESCRIPTION OF EMBODIMENTS

One embodiment of the present invention will be described with reference to the drawings.

Figure 1:
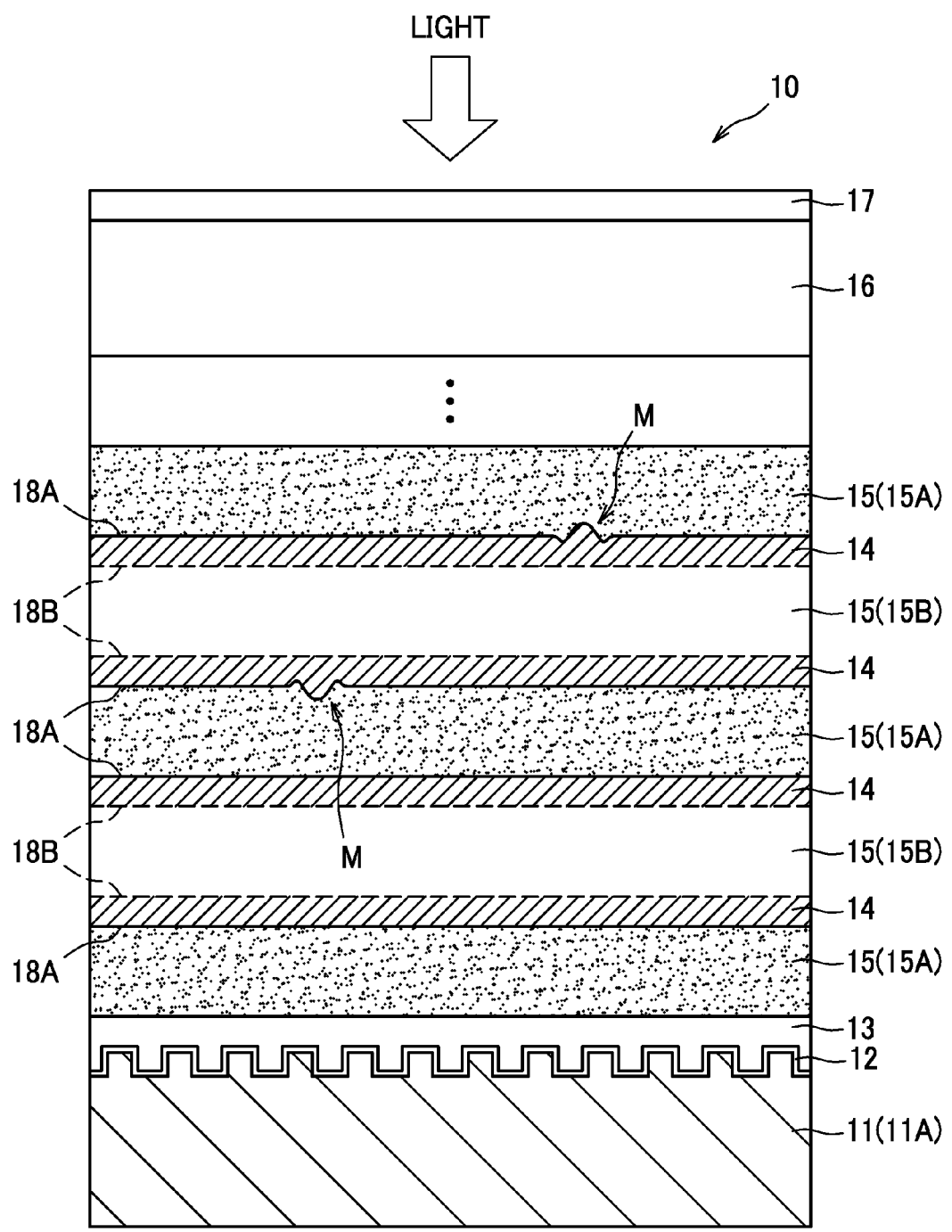
FIG. 1 is a sectional view of an optical information recording medium.

As seen in FIG. 1, an optical information recording medium 10 according to one exemplary embodiment includes a substrate 11, a reflective layer 12, a spacer layer 13, a plurality of recording layers 14, a plurality of intermediate layers 15 (adhesive agent layers 15A and recording layer support layers 15B), a cover layer 16, and a hard coat layer 17. In this embodiment, an interface formed between a recording layer 14 and an adhesive agent layer 15A is referred to as a recording interface 18A as an example of a first interface, and an interface formed between a recording layer 14 and a recording layer support layer 15B is referred to as a non-recording interface 18B as an example of a second interface.

The substrate 11 is a support member for supporting the recording layers 14, the intermediate layers 15, and other layers. As an example, the substrate 11 is a circular plate made of polycarbonate. In the present invention, the material of the substrate 11 is not specifically limited. It is preferable that the substrate 11 has a thickness in the range of 0.02-2 mm. Further, the substrate 11 according to this embodiment has asperities (servo signal) which functions as a guide for tracking servo on the surface where a recording/reading beam is incident (upper-side surface in the drawing), and therefore the substrate 11 also functions as a guide layer 11A. The guide layer 11A may be a layer where the servo signal has been recorded, for example, by utilizing a change in the refractive index. Further, the guide layer 11A may be provided as a layer different from the substrate 11.

The reflective layer 12 is a layer for reflecting the servo beam and consists of an aluminum thin film evaporated onto the uneven surface of the substrate 11 (guide layer 11A). Providing the reflective layer 12 makes it possible to detect the servo signal at the incident side of the servo beam, and therefore the structure of the reading apparatus can be simplified.

The spacer layer 13 is a layer for adjusting the distance between the recording layer 14 and the guide layer 11A and made of a material such as thermoplastic resin, thermosetting resin, ultraviolet curable resin, and adhesive. Preferably, the spacer layer 13 has a thickness in the range of 5-100 μm. Providing the spacer layer 13 makes it possible to reduce the likelihood that light reflected by the guide layer 11A affects the recording layer 14 nearest to the guide layer 11A.

The recording layer 14 is a layer made of a light-sensitive material on which information is optically recorded; the recording layer 14 includes a recording material which comprises a polymer compound and a one-photon absorption dye absorbing a recording beam and covalently bonded to the polymer compound. To be more specific, a coupling strength $\Delta^2$ between the one-photon absorption dye and the polymer compound in the recording material is higher than a coupling strength estimated to be exerted between the same one-photon absorption dye and the same polymer compound if the one-photon absorption dye is dispersed in the polymer compound in the recording material. Herein, the term "coupling strength" indicates a value depending on the strength of the energy interaction between the dye and the polymer compound (polymer); if the coupling strength is high, the amount of energy exchangeable between the dye and the polymer is large. The coupling strength can be obtained first by measuring the echo-peak shift, then obtaining a correlation function of energy fluctuations from the echo-peak shift, and finally numerical calculations using the obtained correlation function. The three-pulse photon echo measurement disclosed in the following Reference [1] can be used as the echo-peak shift measurement. Herein, the numerical calculations are carried out in a manner similar to those described in the following Reference [2], and the coupling strength $\Delta^2$ can be obtained as follows.

Reference [1]: S. A. Passino, Y. Nagasawa, T. Joo, G. R. Fleming, J. Phys. Chem., 1997, 101, 725-731.

Reference [2]: W. P. de Boeij, M. S. Pshenichnikov, D. A. Wiersma, J. Phys. Chem., 1996, 100, 11806-11823.

First, the correlation function (M(T)) of energy fluctuations is experimentally obtained from the echo-peak shift. The following function is used as M(T).

$$M(T) = A_g \exp\{-(T/\tau_g)^2\} + \sum_k A_k \exp\{-(T/\tau_k)\}\cos(\omega_k T + \phi_k) + \sum_i A_i \exp\{-(T/\tau_i)\} + A_{in} \quad (1)$$

where A is a coefficient, $\tau$ is a decay time constant, and a subscript indicates each of the components, and further, T is the population time, $\phi$ is the initial phase, and $\omega$ is the oscillation frequency, which is experimentally obtained from the echo-peak shift. From this correlation function, the following equation is obtained.

$$g(t) = \Delta^2 \int_0^t d\tau_1 \int_0^{\tau_1} d\tau_2 M(\tau_2) - i\lambda \int_0^t d\tau \{1 - M(\tau)\} \quad (2)$$

In this equation, $\tau$ is an integration variable. Herein, $\lambda$ is the reorganization energy and is given by the following equation.

$$\lambda = \int_0^{+\infty} d\omega \frac{C(\omega)}{\omega} \quad (3)$$

Further, M(T) is given by the following equation using a spectral density ($C(\omega)$).

$$M(T) = \frac{1}{\Delta^2} \int_0^{+\infty} d\omega C(\omega) \coth\left(\frac{\hbar\beta\omega}{2}\right)\cos(\omega T) \quad (4)$$

where T is the population time, $\beta$ is the inverse temperature, and $\hbar$ is the reduced Planck constant.

Further, $\Delta^2$ is the coupling strength, which is given by the following equation.

$$\Delta^2 = \int_0^{+\infty} d\omega C(\omega) \coth\left(\frac{\hbar\beta\omega}{2}\right) \quad (5)$$

The coupling strength, the reorganization energy and the spectral density are obtained by numerical calculations of absorption spectrum, emission spectrum and echo signal using the following equations and by matching with experimental data. The absorption spectrum and the emission spectrum are expressed respectively by the following equations (6) and (7).

$$\sigma_{ABS}(\omega) \propto \text{Re}[\int_0^{+\infty} dt \exp(i(\omega - \omega_{eg}) - g(t))] \quad (6)$$

$$\sigma_{EM}(\omega) \propto \text{Re}[\int_0^{+\infty} dt \exp(i(\omega - \omega_{eg} + 2\lambda) - b^*(t))] \quad (7)$$

where t is an integration variable.

Further, the following equation is used for the numerical calculation of the echo signal ($S(\tau, T)$).

$$S(\tau, T) \propto \int_0^{+\infty} dt |P^{(3)}(t, \tau, T)|^2 \quad (8)$$

where $P^{(3)}(t, \tau, T)$ is expressed by the following equation (9).

$$P^{(3)}(t, \tau, T) \propto \quad (9)$$
$$\exp\left(-\frac{T}{T_1}\right)\int_0^\infty dt_3 \int_0^\infty dt_2 \int_0^\infty dt_1 \{R_{II}(t_1, t_2, t_3) + R_{III}(t_1, t_2, t_3)\} \times$$
$$E_1^*(t + \tau + T - t_3 - t_2 - t_1) E_2(t + T - t_3 - t_2)$$
$$E_3(t - t_3)\exp(-i(\omega_{eg} - \omega)(t_3 - t_1)) +$$
$$\exp\left(-\frac{T}{T_1}\right)\int_0^\infty dt_3 \int_0^\infty dt_2 \int_0^\infty dt_1 \{R_I(t_1, t_2, t_3) + R_{IV}(t_1, t_2, t_3)\} \times$$
$$E_1^*(t + \tau + T - t_3 - t_2) E_2(t + T - t_3 - t_2 - t_1)$$
$$E_3(t - t_3)\exp(-i(\omega_{eg} - \omega)(t_3 + t_1)) +$$
$$\exp\left(-\frac{T}{T_1}\right)\int_0^\infty dt_3 \int_0^\infty dt_2 \int_0^\infty dt_1 \{R_{II}(t_1, t_2, t_3) + R_{III}(t_1, t_2, t_3)\} \times$$
$$E_1^*(t + \tau + T - t_3 - t_2 - t_1) E_2(t - t_3)$$
$$E_3(t + \tau - t_3 - t_2)\exp(-i(\omega_{eg} - \omega)(t_3 - t_1)) +$$
$$\exp\left(-\frac{T}{T_1}\right)\int_0^\infty dt_3 \int_0^\infty dt_2 \int_0^\infty dt_1 \{R_I(t_1, t_2, t_3) + R_{IV}(t_1, t_2, t_3)\} \times$$
$$E_1^*(t + \tau + T - t_3 - t_2) E_2(t - t_3)$$
$$E_3(t + T - t_3 - t_2 - t_1)\exp(-i(\omega_{eg} - \omega)(t_3 + t_1))$$

where the subscript of each variable t indicates the order of three pulse radiations. $T_1$ is the decay time of population, $\tau$ is the coherent time, and T is the population time. Further, $\omega_{eg}$ is the transition frequency between the electronic ground state and the excited state, and E is the electric field of the laser pulse. $R(t_1, t_2, t_3)$ in the equation (9) is given as follows and relates to the equation (2). Herein, $t_1, t_2, t_3$ represent time until the pulse beam reaches the sample.

$$R_I(t_1, t_2, t_3) = \exp\{-g^*(t_3) - g(t_1) - g^*(t_2) + g^*(t_2 + t_3) + g(t_1 + t_3) - g(t_1 + t_2 + t_3)\} \quad (10a)$$

$$R_{II}(t_1, t_2, t_3) = \exp\{-g^*(t_3) - g^*(t_1) + g(t_2) - g(t_2 + t_3) - g^*(t_1 + t_3) + g^*(t_1 + t_2 + t_3)\} \quad (10b)$$

$$R_{III}(t_1, t_2, t_3) = \exp\{-g(t_3) - g^*(t_1) + g^*(t_2) - g^*(t_2 + t_3) - g(t_1 + t_3) + g^*(t_1 + t_2 + t_3)\} \quad (10c)$$

$$R_{IV}(t_1, t_2, t_3) = \exp\{-g(t_3) - g(t_1) - g(t_2) + g(t_2 + t_3) + g(t_1 + t_3) - g(t_1 + t_2 + t_3)\} \quad (10d)$$

It should be noted that because the coupling strength measured will vary depending on the combination of the polymer compound and the one-photon absorption dye, the absolute value of the coupling strength is not a problem for the recording material according to the present invention. The recording material according to the present invention in which "a coupling strength $\Delta^2$ between the one-photon absorption dye and the polymer compound is higher" is defined as follows: first, a particular one-photon absorption dye and a particular polymer compound are specified, and then, a coupling strength of a recording material in which the one-photon absorption dye is dispersed in the polymer compound and a coupling strength of a recording material in which the one-photon absorption dye is bonded to the polymer compound are measured, and if the coupling strength of the latter recording material is higher than that of the former recording material, then the latter recording material is defined as the recording material according to the present invention.

Figure 2B:
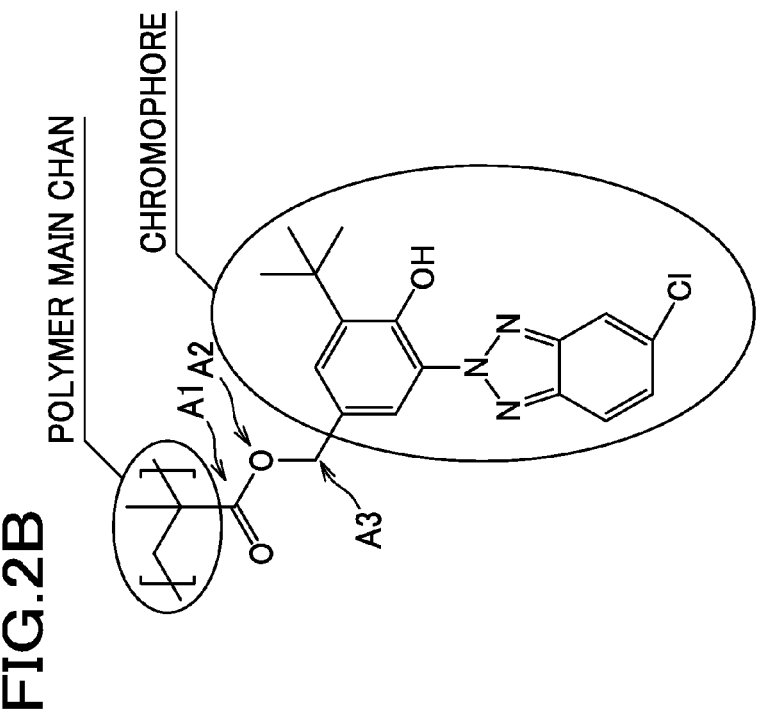
FIGS. 2A and 2B are views explaining the number of atoms involved in bonding.
Figure 2A:
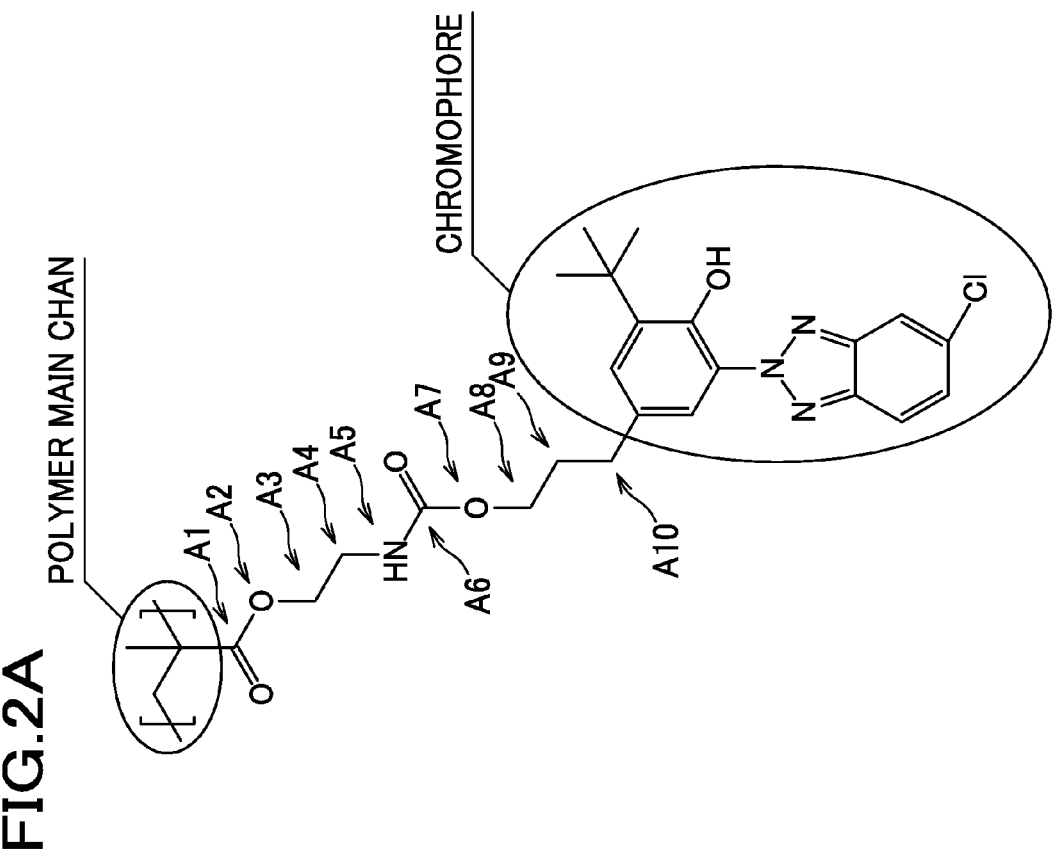

Further, it is preferable that the number of atoms involved in bonding of the one-photon absorption dye to the polymer compound is less than 10. Herein, the number of atoms involved in bonding of the one-photon absorption dye to the polymer compound indicates the number of atoms by which the polymer compound and a chromophore of the one-photon absorption dye are linearly bonded to each other. For example, in the case of a compound shown in FIG. 2A, the number of atoms involved in the coupling is 10 as the atoms A1 to A10 are present between a polymer main chain and a chromophore, and in the case of a compound shown in FIG. 2B, the number of atoms involved in the coupling is 3 as the atoms A1 to A3 are present between a polymer main chain and a chromophore.

The one-photon absorption dye for absorbing the recording beam may include, for example, dyes which have been conventionally used as a thermally deformable heat mode type recording material. Specific examples of the dyes may include methine dyes (cyanine dyes, hemicyanine dyes, styryl dyes, oxonol dyes, merocyanine dyes, etc.), large ring dyes (phthalocyanine dyes, naphthalocyanine dyes, porphyrin dyes, etc.), azo dyes (including azo-metal chelate dyes), arylidene dyes, complex dyes, coumarin dyes, azole derivatives, triazine derivatives, benzotriazole derivatives, benzophenone derivatives, phenoxazine derivatives, phenothiazine derivatives, 1-aminobutadiene derivatives, cinnamic acid derivatives, quinophthalone dyes, etc.

The polymer compound to which the one-photon absorption dye is bonded may include, for example, polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), poly(vinyl benzoate), poly(vinyl pivalate), poly(ethyl acrylate), poly(butyl acrylate), polyacenaphthylene, polyvinylnaphthalene, polyvinyl carbazole, polymaleimide, polyvinyl phthalimide, poly (indene), cycloolefin polymer, etc.

As described above, the recording material has a higher coupling strength as compared with a recording material in which the one-photon absorption dye is dispersed in the polymer compound because the one-photon absorption dye and the polymer compound are bonded to each other in a certain condition.

The polymer compound to which the one-photon absorption dye is bonded may include, for example, a compound A of the following chemical structural formula. The compound A includes polybenzylmethacrylate as the polymer compound and a benzotriazole derivative as the one-photon absorption dye; the benzotriazole derivative is covalently bonded to polybenzylmethacrylate.

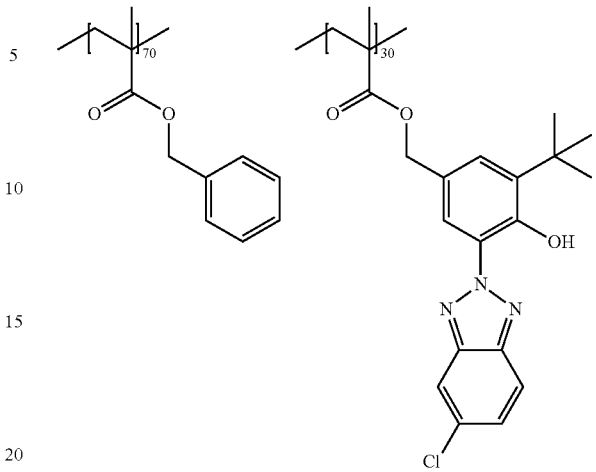

Compound A

The recording layer 14 is a layer for recording dotted recording marks M (information) and configured such that when it is irradiated with a recording beam, the one-photon absorption dye absorbs the recording beam and generates heat, and the generated heat causes the polymer compound to undergo a change in shape to thereby cause the recording interface 18A to stick out into the intermediate layer 15 (adhesive agent layer 15A) to form protrusions. According to the present invention, a recording mark M may include a center portion having a protrusion sticking out from the recording layer 14 into the adhesive agent layer 15A, and the protrusion may be surrounded by a recess which is recessed from the adhesive agent layer 15A into the recording layer 14 (a recessed shape recessed from a position of the recording interface 18A before undergoing a change in shape).

For this reason, each recording layer 14 is thicker than the conventional recording layer containing a polymer binder and a dye, and the thickness of one recording layer 14 is preferably not less than 50 nm. If the thickness is less than 50 nm, the interface between the recording layer and the intermediate layer (corresponding to the recording interface 18A or the non-recording interface 18B in this embodiment) deforms such that a recessed shape is formed with reference to the recording layer before undergoing a change in shape. On the contrary, if the thickness is not less than 50 nm, the interface deforms such that a protrusion is formed at a center of the recorded spot. Although the thickness of the recording layer 14 does not have a determinate upper limit, it is preferable that the thickness thereof is not more than 5 μm in order to increase the number of recording layers 14 as many as possible. To be more specific, the thickness of the recording layer 14 is more preferably in the range of 100 nm to 3 μm, and further preferably in the range of 200 nm to 2 μm. As an example, the thickness of the recording layer 14 is 1 μm in this embodiment.

A plurality of recording layers 14 are provided, and the number of recording layers 14 provided is, for example, approximately in the range of 2-100 layers. To increase the storage capacity of the optical information recording medium 10, a large number of recording layers 14, for example, 10 or more recording layers 14 are preferable. This can achieve high-capacity recording of the optical information recording medium 10. Further, the recording layer 14 is made of a material of which the refractive index does not substantially change before and after recording performed by changing the shape of the recording interface 18A.

It is preferable that the recording layer 14 has an absorptance (of one-photon absorption dye) to the recording beam not more than 10% per one layer. Further, in order to increase the number of recording layers 14, it is preferable that the absorptance of each recording layer is as small as possible as long as recording can be performed. Therefore, it is preferable that the absorptance of the recording layer 14 is not more than 8%, more preferably not more than 5%, and further preferably not more than 3%. This is because, for example, if the intensity of the recording beam which reaches the farthermost recording layer 14 has to be equal to or more than 50% of the intensity of the radiated recording beam, it is necessary that the absorptance per one recording layer is equal to or less than 8% in order to obtain eight recording layers, and that the absorptance per one recording layer is equal to or less than 3% in order to obtain twenty recording layers. If the absorptance is higher, the number of recording layers should be smaller; this lessens the effect of increasing the recording capacity by increasing the number of recording layers. As with the present invention, if the recording material in which the coupling strength between the one-photon absorption dye and the polymer compound is higher is used in the recording layer, the recording layer has a relatively high recording sensitivity irrespective of a lower absorptance of the recording layer. Therefore, a large storage capacity can be achieved by increasing the number of recording layers 14.

The recording layer 14 preferably comprises the one-photon absorption dye of less than 50 mass % of the polymer compound. In other words, it is preferable that the content in mass percentage of the polymer compound is equal to or more than 50 mass % (i.e., the polymer compound is the main component). By this recording layer 14, a sufficient height (amount of protrusion) of the protrusion (recording mark M) can be formed with reference to the recording interface 18A before undergoing a change in shape. When the recording layer 14 is irradiated with the recording beam, the polymer compound undergoes a thermal expansion by absorption of the recording beam, thereafter the irradiation of the recording beam is stopped and the acquired expanded shape is maintained by quenching, to thereby form a protrusion. Therefore, if the content in mass percentage of the one-photon absorption dye is equal to or more than 50 mass % (i.e., the content in mass percentage of the polymer compound is less than 50 mass %), for example, the material of the polymer compound (which undergoes a thermal expansion by absorption of the recording beam) outflows and spills outside the expanded portion, with the result that formation of a protrusion is less likely to occur.

The recording layer 14 may be formed by any conventional method; for example, a polymer compound to which an one-photon absorption dye is bonded may be dissolved in a solvent, followed by spin coating or blade coating with the obtained liquid to form a recording layer 14. Examples of the solvent may include dichloromethane, chloroform, methyl ethyl ketone (MEK), acetone, methyl isobutyl ketone (MIBK), toluene, hexane, propyleneglycol monomethylether acetate (PGMEA) and cyclohexanone.

The intermediate layers 15 are provided between the recording layers 14, in other words, each intermediate layer 15 is provided adjacently above and below the recording layer 14 as shown in the drawing. To be more specific, the intermediate layer 15 includes an adhesive agent layer 15A and a recording layer support layer 15B, which are alternately arranged between the recording layers 14. In other words, one recording layer 14 is sandwiched between the adhesive agent layer 15A and the recording layer support layer 15B; in this embodiment, the adhesive agent layer 15A, the recording layer 14, the recording layer support layer 15B, and the recording layer 14 are repeatedly arranged in this order as viewed from the substrate 11 side.

In order to prevent crosstalk across a plurality of recording layers 14, the intermediate layer 15 is provided to from a predetermined amount of space between the adjacent recording layers 14. For this purpose, it is preferable that the thickness of the intermediate layer 15 is not less than 2 μm, and more preferably not less than 5 μm. Further, as long as the crosstalk can be prevented, it is preferable that the thickness of the intermediate layer 15 is as small as possible, such as 20 μm or less. In this embodiment, the thickness of the intermediate layer 15 (i.e., adhesive agent layer 15A and recording layer support layer 15B) is 10 μm each as an example. Since the thickness of the adhesive agent layer 15A and the thickness of the recording layer support layer 15B are the same, namely 10 μm, the recording interface 18A have non-constant pitches of 10 μm, 12 μm, 10 μm, 12 μm . . . . This can reduce the likelihood that the interference between a readout beam (i.e., the reflected beam at the recording interface 18A to be generated upon reading information) and a reflected beam of a reading beam (i.e., the reflected beam of the reading beam generated at a recording interface 18A that is adjacent to the recording interface 18A used for reading the information) affects the readout beam.

The intermediate layers 15 are made of materials which are unreactive to irradiation with a laser beam at the time of recording and reading out the information. Further, in order to minimize the loss of the recording beam, the reading beam, and the readout beam (light including a readout signal generated by irradiation with the reading beam), it is preferable that each of the intermediate layers 15 is made of a material which does not substantially absorb the recording beam, the reading beam, and the readout beam, in other words, a material which is transparent to the recording beam, the reading beam, and the readout beam. Herein, the term "transparent" indicates that the absorptance is not more than 1%.

The adhesive agent layer 15A has adhesiveness to enable attachment to another surface and is softer than the recording layer 14. For example, the glass transition temperature of the adhesive agent layer 15A is lower than that of the recording layer 14. Accordingly, providing the adhesive agent layer 15A which is softer than the recording layer 14, as an intermediate layer 15 adjacent to one side of the recording layer 14 makes it possible to easily deform the intermediate layer 15 when the recording layer 14 is heated and expanded by the irradiation with the recording beam, with the result that a deformation is easily caused in the recording interface 18A.

The recording layer support layer 15B is made of a material such as ultraviolet curable resin and has hardness equal to or greater than that of the recording layer 14. For example, the recording layer support layer 15B has a glass transition temperature equal to or higher than that of the recording layer 14. Accordingly, providing the recording layer support layer 15B which is harder than the recording layer 14 as an intermediate layer 15 adjacent to the other side of the recording layer 14 makes it possible to cause the optical information recording medium 10 to deform such that when the recording layer 14 is irradiated with the recording beam, no protrusion is formed in the non-recording interface 18B which is an interface between the recording layer 14 and the recording layer support layer 15B but a protrusion (recording mark M) is formed in the recording interface 18A which is an interface between the recording layer 14 and the above-described adhesive agent layer 15A.

The adhesive agent layer 15A and the recording layer support layer 15B have different refractive indices, but the recording layer support layer 15B and the recording layer 14 have substantially the same refractive index. To be more specific, the recording layer 14 and the recording layer support layer 15B have comparative refractive indices such that $((n3-n1)/(n3+n1))^2 \leq 0003$ is satisfied, where n1 represents the refractive index of the recording layer 14, and n3 represents the refractive index of the recording layer support layer 15B, that is, the reflectivity at the non-recording interface 18B is not more than 0.0003.

To prevent reflection at the interface (non-recording interface 18B) between the recording layer 14 and the recording layer support layer 15B, it is preferable that the refractive indices of the recording layer 14 and the recording layer support layer 15B are as close as possible and that the difference between the refractive indices of the recording layer 14 and the recording layer support layer 15B is preferably not more than 0.05, more preferably not more than 0.03, further preferably not more than 0.01, and most preferably 0. As an example, if the refractive index n1 of the recording layer 14 is 1.565 and the refractive index n3 of the recording layer support layer 15B is 1.564, $((n3-n1)/(n3+n1))^2$ is almost 0.

On the contrary, the refractive indices of the adhesive agent layer 15A and the recording layer 14 are different from each other to some appropriate degree. Accordingly, the refractive index rapidly changes at the interface (recording interface 18A) between the recording layer 14 and the adhesive agent layer 15A, so that the reading beam can be reflected. To be more specific, it is preferable that the difference between the refractive indices of the adhesive agent layer 15A and the recording layer 14 is greater than the difference between the refractive indices of the recording layer support layer 15B and the recording layer 14 and is not more than 0.11. To be more specific, the refractive indices of the recording layer 14 and the adhesive agent layer 15A are different from each other to some appropriate degree such that the following relation is satisfied:

$$0.0005 < ((n2-n1)/(n2+n1))^2 \leq 0.04$$

where n2 represents the refractive index of the adhesive agent layer 15A, that is, the reflectivity at the recording interface 18A is not less than 0.0005 and not more than 0.04.

If the reflectivity is not less than 0.0005, the quantity of the reflected beam at the reflective interface 18A is large, so that a high signal-to-noise ratio is obtained at the time of reading the information. Further, if the reflectivity is not more than 0.004, the quantity of the reflected beam at the reflective interface 18A is restricted to an appropriately small degree, so that the recording/reading beam can reach far deeper recording layers 14 without considerable attenuation upon recording and reading out the information. This makes it possible to achieve high storage capacity of the optical information recording medium 10 by providing a large number of recording layers 14. As an example, if the refractive index n1 of the recording layer 14 is 1.565 and the refractive index n2 of the adhesive agent layer 15A is 1.477, $((n2-n1)/(n2+n1))^2$ is approximately 0.0008.

As described above, the refractive indices of the recording layer 14 and the intermediate layer 15 can be adjusted to enhance the total transmittance of the recording interface 18A and the non-recording interface 18B; therefore, in the case of multi-layered recording layers, the light beam can reach far deeper recording layers 14 from the recording/reading beam radiation side. This is advantageous for increasing the storage capacity by increasing the number of recording layers. Especially in this embodiment, since the refractive index of the recording layer support layer 15B and the refractive index of the recording layer 14 are substantially the same, the light reflectivity at the non-recording interface 18B is substantially zero, so that the light beam can reach far deeper recording layers 14. This is advantageous for increasing the storage capacity by increasing the number of recording layers.

In order to adjust the refractive indices of the recording layer 14 and the intermediate layer 15, the composition of the material for the recording layer 14 and the composition of the material for the intermediate layer 15 can be adjusted. To be more specific, since the material for the recording layer 14 contains a recording material comprising a one-photon absorption dye bonded to a polymer compound, the polymer compound or the dye may be selectively adjusted to have an appropriate refractive index and to vary the composition ratio, whereby the refractive index of the recording layer 14 can be adjusted as desired. The refractive index of the polymer compound varies depending on the degree of polymerization even if they have similar basic components. For this reason, the refractive index of the recording layer 14 can also be adjusted using polymer compounds with different degrees of polymerization or by adjusting the degree of polymerization of the polymer compound. Further, the refractive index of the recording layer 14 can be adjusted by mixing a plurality of polymer compounds. Further, a refractive index matching material (inorganic particulate and the like) may be added to adjust the refractive index of the recording layer 14.

To adjust the refractive index of the intermediate layer 15, the degree of polymerization of the polymer material such as resin usable as the material for the intermediate layer 15 may be adjusted. Further, to adjust the refractive index of the intermediate layer 15, a material usable for the intermediate layer 15 may be added as desired or a refractive index matching material (inorganic particulate and the like) may be added.

The cover layer 16 is a layer for protecting the recording layers 14 and the intermediate layers 15, and is made of a material which allows the recording beam, the reading beam, and the readout beam to pass through the cover layer 16. As an example, the cover layer 16 may be formed by applying and curing ultraviolet curable resin or by attaching a film via adhesive or the like. Providing the cover layer 16 can prevent the recording layers 14 and the intermediate layers 15 from being damaged or soiled. It is preferable that the thickness of the cover layer 16 is in the range of 0.01-0.2 mm. If the cover layer 16 is too thin, damage or soil of the cover layer 16 may be detected during recording and reading the information. On the other hand, if the cover layer 16 is too thick, aberration may occur in the optical system of an optical recording apparatus. However, the above configuration can restrict these disadvantages.

The hard coat layer 17 is a layer provided on the light-incident surface (upper surface in the drawing) of the optical information recording medium 10, and is made of a material such as urethane resin, acrylic resin, urethane acrylate resin, and epoxy resin. Providing the hard coat layer 17 can prevent the light-incident surface of the optical information recording medium 10 from being damaged or soiled. According to the present invention, the hard coat layer may also serve as the above-described cover layer.

Next, description will be given of a method of recording/reading information on/from the optical information recording medium 10 configured as described above.

Figure 3:
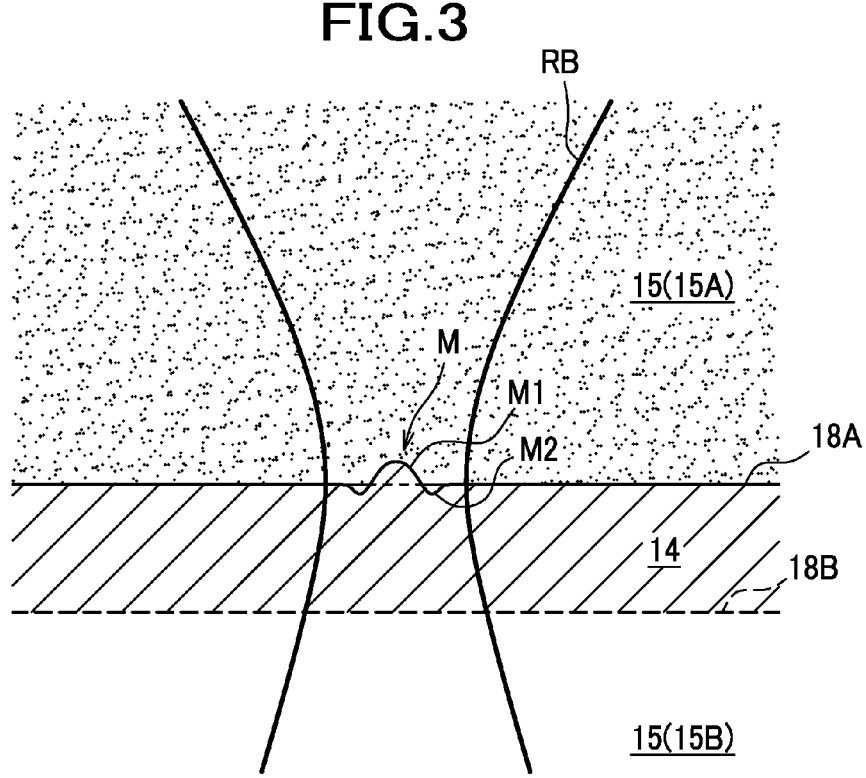
FIG. 3 is a diagram illustrating a recording mark formed at the time of recording information.

To record information in a desired recording layer 14, as seen in FIG. 3, the recording layer 14 is irradiated with a laser beam (recording beam RB) output of which is modulated in accordance with the information to be recorded. In this embodiment, since the dye contained in the recording layer 14 is a one-photon absorption dye, a semiconductor laser used for the conventional optical recording and having a small peak power can be adequately used to produce a laser beam. Although a focal position of the recording beam RB is not limited to a specific position, it is preferable that the recording beam RB is focused on or around the recording interface 18A. To be more specific, it is preferable that the focal position is adjusted on the recording interface 18A and thereafter slightly shifted toward the recording layer 14.

When irradiating the recording layer 14 with the recording beam RB, the recording beam-irradiated area changes its shape such that the center portion thereof has a shape protruding from the recording layer 14 into the adhesive agent layer 15A (intermediate layer 15), to thereby form a recording mark M (pit). More specifically, the recording mark M shown in FIG. 3 includes a protrusion M1 at the center portion, and a ring-shaped recess portion M2 surrounding the protrusion M1 and recessed into the recording layer 14. The distance of the recess portion M2 from the recording interface 18A (the recording interface 18A before undergoing a change in shape) to the deepest portion of the recess portion M2 is smaller than the distance of the protrusion M1 from the recording interface 18A (the recording interface 18A before undergoing a change in shape) to the peak of the protrusion M1. In other words, it can be said that the recording mark M as a whole has a generally protruding shape. Depending on the recording conditions, the optical information recording medium 10 may only include protrusions M1 without formation of any recess portions M2 surrounding the protrusions.

As described above, since information can be recorded in the optical information recording medium 10 as protrusions sticking out from the recording layer 14 into the adhesive agent layer 15A, it is not necessary to require such a high energy that can result in decomposing or changing in phase of the recording layer, nor does it require such a large absorptance of the recording layer as is required in the conventional recording for the formation of recess portions; therefore, the information can be recorded with a relatively small energy. Accordingly, information can be recorded at high sensitivity, and as the required absorptance to the recording beam per recording layer 14 is smaller, the number of recording layers 14 can be increased.

Figure 4:
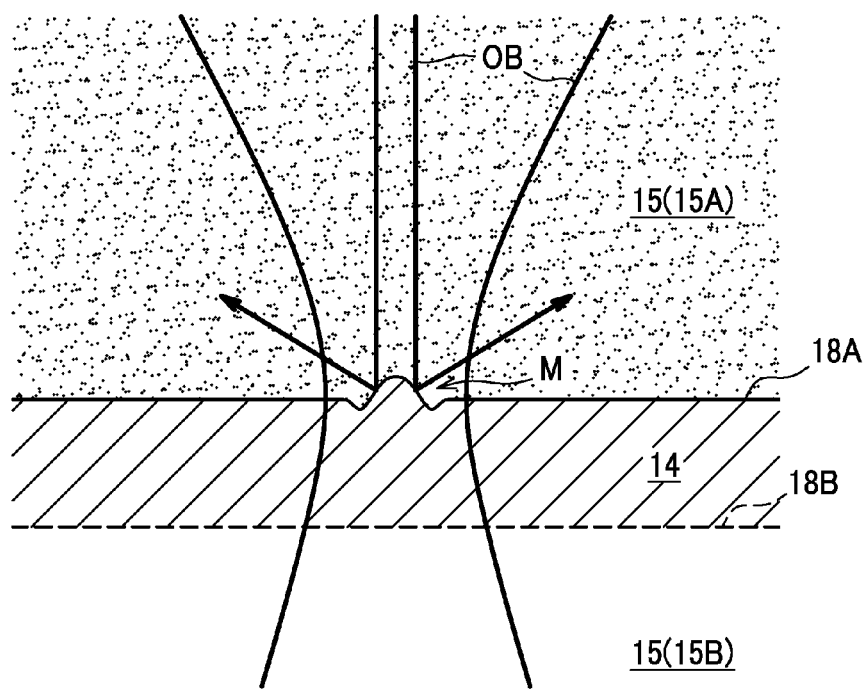
FIG. 4 is a diagram explaining reading of the information.

As seen in FIG. 4, when the recording mark M is irradiated with the reading beam OB using a continuous wave laser, the reading beam OB is reflected at the recording interface 18A because of the difference between the refractive index of the recording layer 14 and the refractive index of the adhesive agent layer 15A. At this time, a difference in the light intensity will appear between the reflected beam at the recording interface 18A surrounding the recording mark M and the reflected beam at the recording mark M, so that the recording mark M can be detected based on the difference of the reflectivity. It is noted that since the refractive index of the recording layer 14 does not change as a result of recording information, a reflection of the reading beam OB occurs only at the recording interface 18A but not inside the recording layer 14, which leads to stable detection of the recording mark M. For the purpose of this optical detection, it is preferable that the protrusion M1 sticks out approximately in the range of 1-300 nm with reference to the interface (recording interface 18A) before undergoing a change in shape.

In this embodiment, since the recording mark M includes the recess portion M2 surrounding the protrusion M1, it is assumed that when the recording mark M is irradiated with the reading beam OB for reading the recording mark M, the light intensity distribution of the reflected beam at the recording mark M shows an abrupt change in accordance with the distance from the center of the protrusion M1, as compared to a recording mark M only including a protrusion M1. This makes it possible to read the recording mark M with high degree of modulation.

The present invention is applicable not only for recording information by causing the recording layer 14 to deform to form a protrusion, but also for recording the information by forming a recess portion. For example, the recording layer 14 may be deformed into a recess shape to record the information using a recording beam with an increased level of energy as obtained by increasing the energy of the recording beam, such as by increasing the peak power of the recording beam. Further, the non-recording interface 18B may deform upon recording the information in the optical information recording medium 10 according to this embodiment; however, since the reflection of the reading beam OB does not occur at the non-recording interface 18B, this deformation in the non-recording interface 18B does not affect reading of the information.

To erase the information recorded in the recording layer 14, the recording layer 14 is heated to a temperature as high as the glass transition temperature of the polymer compound, preferably to a temperature higher than the glass transition point, so that the fluidity of the polymer compound is increased and the deformation in the recording interface 18A disappears due to surface tension to thereby return to its original flat plane. As a result, the information recorded in the recording layer 14 can be erased. Because the information is erasable in this way, re-recording in the recording layer 14 (repeated recording) can be achieved. When the recording layer 14 is heated for that purpose, the recording layer 14 may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser used may be the laser used for reading out the information, or alternatively, another laser may be used. In both cases, it is preferable that a laser used emits light having a wavelength absorbable by the one-photon absorption dye in the recording layer 14.

Further, when the information is to be erased by heating the recording layer 14, the optical information recording medium 10 may be heated as a whole to a temperature higher than the glass transition temperature of the polymer compound so that the information recorded in all the recording layers 14 can be erased at once. Accordingly, all the information recorded in the optical information recording medium 10 is easily erased for initialization. Further, when the optical information recording medium 10 is to be disposed of, the information can be easily erased irreversibly.

As described above, since the optical information recording medium 10 according to this embodiment includes a one-photon absorption dye as a dye contained in the recording layer 14, information can be recorded using a laser beam having a small peak power. Further, if a semiconductor laser is used to emit a laser beam having a small peak power, the output of the laser beam can be readily adjusted. Especially, in this embodiment, since the coupling strength between the one-photon absorption dye and the polymer compound in the recording material is higher because of the bonding between the one-photon absorption dye and the polymer compound than the coupling strength estimated to be exerted between the same one-photon absorption dye and the same polymer compound if the one-photon absorption dye is dispersed in the polymer compound in the recording material, the recording layer can provide an enhanced recording sensitivity as will be described later in examples. Furthermore, since the recording layer 14 of the optical information recording medium 10 contains a recording material comprising a dye bonded to a polymer compound, it is possible to prevent the dye from spreading into the intermediate layer 15. This can improve the long-term stability of the optical information recording medium 10.

Although one embodiment of the present invention has been described above, the present invention is not limited to the above-described embodiment and various changes and modifications may be made where necessary.

In the above-described embodiment, the optical information recording medium 10 is configured such that when a recording layer 14 is irradiated with the recording beam, a protrusion is formed in only one interface (recording interface 18A) and a protrusion is not formed in the other interface (non-recording interface 18B); however, the present invention is not limited to this configuration. Namely, the optical information recording medium according to the present invention may be configured such that a protrusion sticking out into the adjacent intermediate layer is formed on each interface of the recording layer as different information. To be more specific, this configuration can be achieved if all the intermediate layers adjacent to one recording layer are made, for example, of the adhesive agent layer 15A in the above-described embodiment. In this modification, in order to prevent crosstalk across a plurality of recording layers 14, it is preferable that each one of the recording layers has a thickness not less than 2 μm, more preferably not less than 5 μm, and further preferably not less than 7 μm. Although the thickness of the recording layer does not have a determinate upper limit, in order to increase the number of recording layers, it is preferable that the thickness thereof is thinner (e.g., not more than 20 μm) as long as the crosstalk does not occur across the recording layers.

In the above-described embodiment, the optical information recording medium 10 includes the guide layer 11A, the reflective layer 12, the spacer layer 13, the cover layer 16 and the hard coat layer 17 as shown in FIG. 1. However, the present invention is not limited to this configuration, and the presence or absence of any of these layers is optional. Further, the optical information recording medium 10 may include only one recording layer 14; in this configuration, the intermediate layer 15 is not required. Further, the optical information recording medium 10 may be stored in a cartridge.

EXAMPLES

Description will be given of experiments for characterization of the optical information recording medium according to the present invention.

Recording Material

Example 1

In Example 1, the above-described compound A was used as the recording material. The compound A was synthesized by the following method:

[Synthesis of Monomer (1) (Compound B)]

The synthesis of monomer (1) was carried out according to the following scheme.

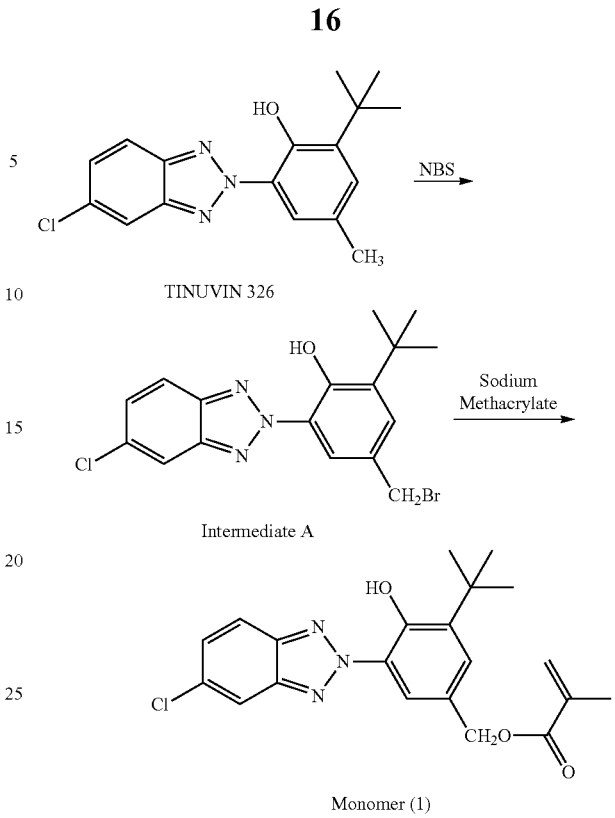

32 g of Tinuvin® 326 (manufactured by BASF) and 20 g of N-bromosuccinimide were dissolved in 200 ml of chloroform, and then 0.14 g of V-601 (manufactured by Wako Pure Chemical Industries, Ltd.) was added thereto, followed by heating under reflux for 6 hours. After letting the reaction solution cool, 300 ml of acetonitrile was added thereto while cooling in an ice bath, and the produced crystals were filtrated. As a result, 36 g of Intermediate A was obtained.

8.0 g of Intermediate A and 3.2 g of sodium methacrylate were stirred in 80 ml of acetone for 8 hours. The reaction solution was extracted with chloroform and washed with water, and the solid obtained by distilling away the solvent was re-crystallized with acetonitrile. As a result, 6.3 g of Monomer (1) was obtained.

[Synthesis of Compound A]

3.1 ml of propylene glycol monomethylether acetate was stirred while being heated under nitrogen atmosphere at 90° C. 6.5 ml solution of propylene glycol monomethylether acetate to which 2.0 g of Monomer (1), 2.0 g of benzyl methacrylate, and 0.11 g of V601 (manufactured by Wako Pure Chemical Industries, Ltd.) had been added was added dropwise to the 3.1 ml of propylene glycol monomethylether acetate for 2 hours. After that, 0.11 g of V601 was added and then stirred for 4 hours while being heated at 90° C., followed by allowing it to cool, to thereby obtain a propylene glycol monomethylether acetate solution containing 30 mass % of Compound A.

Comparative Example 1

In Comparative Example 1, the following compound B (the above-described monomer (1)) was used as the dye dispersed in the recording material. The compound B was synthesized by the above-described synthesizing method.

Compound B

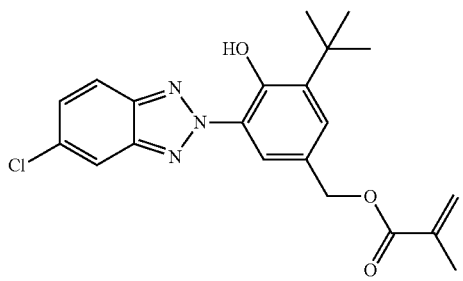

Example 2

In Example 2, the following compound C was used as the recording material.

Compound C

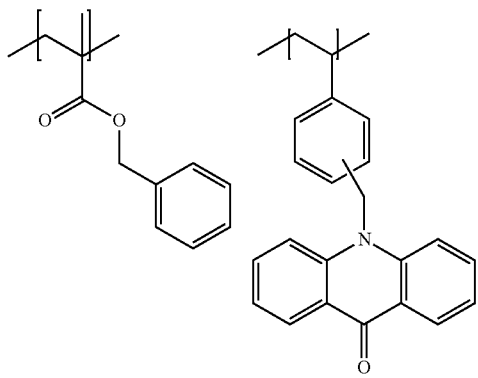

the 10.2 ml of propylene glycol monomethylether acetate for 2 hours. The reaction liquid was stirred for 4 hours while being heated at 90° C., followed by allowing it to cool, to thereby obtain a propylene glycol monomethylether acetate solution containing 40 mass % of Compound C.

Comparative Example 2

In Comparative Example 2, the following compound D (the above-described monomer 4) was used as the dye dispersed in the recording material.

Compound D

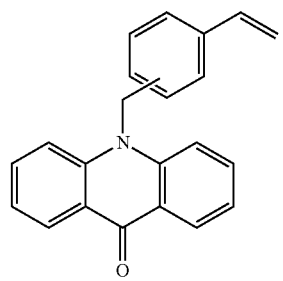

Comparative Example 3

In Comparative Example 3, the following compound E was used as the recording material.

Compound E

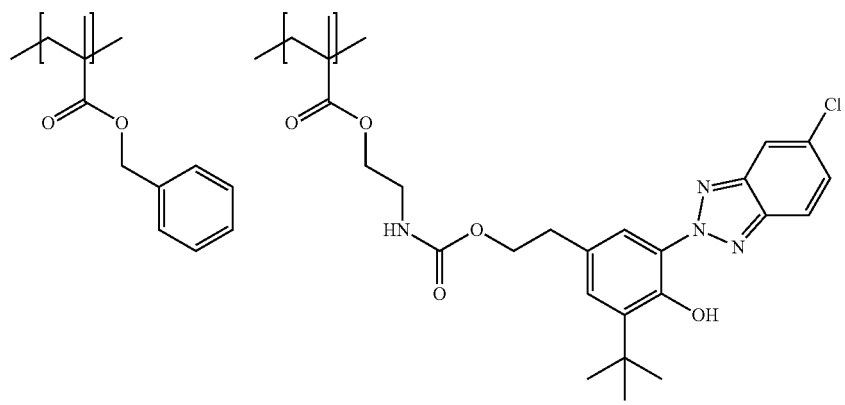

The compound C was synthesized by the following method:

10.2 ml of propylene glycol monomethylether acetate was stirred while being heated under nitrogen atmosphere at 90° C. 10.2 ml solution of propylene glycol monomethylether acetate to which 0.5 g of Monomer 4 disclosed in paragraph [0306] of WO 2008/123601 A2, 12.6 g of benzyl methacrylate, and 0.50 g of V601 (manufactured by Wako Pure Chemical Industries, Ltd.) had been added was added dropwise to The compound E was synthesized by the following method:

(1) Synthesis of Raw Material Compound M-1

Tinuvin® 109 manufactured by BASF was hydrolyzed and reduced to obtain 0.7 g of 3-[3-tert-butyl-5-(5-chloro-2H-benzotriazol-2-yl)-4-hydroxyphenyl]propanol, which was then dissolved in 5 ml of methyl ethyl ketone, together with 0.31 g of Karenz MOI® manufactured by Showa Denko K.K.

After that, 0.02 g of dibutyltin laurate and 0.02 g of p-methoxyphenol were added thereto and reacted at 75° C. for four hours, followed by distillation of the solvent to obtain 1.0 g of Compound M-1.

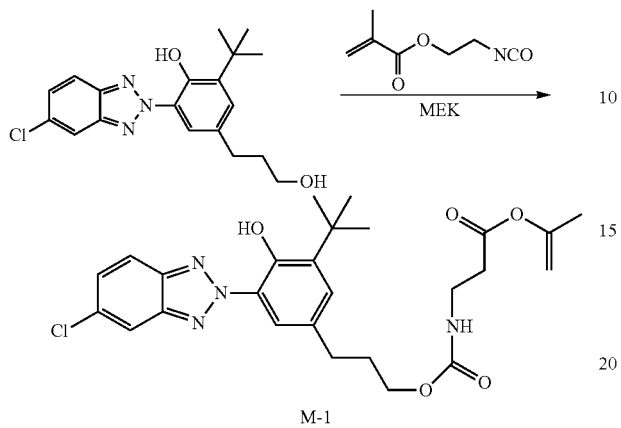

(2) Synthesis of Compound E 3.4 ml of propylene glycol monomethylether acetate was stirred while being heated under nitrogen atmosphere at 90° C. 3.4 ml solution of propylene glycol monomethylether acetate to which 1.0 g of Compound M-1, 3.5 g of benzyl methacrylate, and 0.14 g of V-601 (manufactured by Wako Pure Chemical Industries, Ltd.) had been added was added dropwise to the 3.4 ml of propylene glycol monomethylether acetate for 2 hours. After that, 0.14 g of V-601 was added and then stirred for 4 hours while being heated at 90° C., followed by allowing it to cool, to thereby obtain 11 g of a propylene glycol monomethylether acetate solution containing 40 mass % of the compound E.

Comparative Example 4

In Comparative Example 4, the following compound F was used as the dye dispersed in the recording material.

Compound F

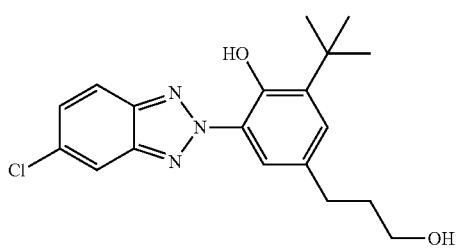

Tinuvin® 109 manufactured by BASF was hydrolyzed and reduced to obtain the compound F.

<Production of Optical Information Recording Medium>

As shown in FIG. 5, optical information recording media produced in experiments are configured to include a substrate made of glass and having a thickness of 1 mm, and a first intermediate layer (recording layer support layer) having a thickness of 20 μm, a recording layer having a thickness of 1 μm, a second intermediate layer (adhesive agent layer) having a thickness of 20 μm, and a cover layer having a thickness of 67 μm are laminated in this order onto the substrate.

Example 1

(1) Formation of First Intermediate Layer
(Recording Layer Support Layer)

Ultraviolet curable resin (SD-640 manufactured by DIC Corporation, Tg=86° C.) was applied to a glass substrate (diameter: 120 mm, thickness: 1 mm) by spin coating to make a layer of 20 μm thickness. The ultraviolet curable resin was cured by irradiation with ultraviolet light to thereby form an intermediate layer (recording layer support layer).

(2) Formation of Recording Layer

The compound A was diluted with PGMEA (propyleneglycol monomethylether acetate), so that a coating liquid with a solid content concentration of 13 mass % was prepared. The coating liquid was applied onto the first intermediate layer by spin coating to form a recording layer having a thickness of 1 μm. The concentration of the compound A in the coating liquid was adjusted such that the light absorptance of the recording layer having a thickness of 1 μm became 8%.

(3) Formation of Second Intermediate Layer
(Adhesive Agent Layer)

As a releasable sheet, a polyethylene terephthalate film was prepared; the surface of the polyethylene terephthalate film had been coated with a silicone releasable layer. An acrylic ester-based adhesive agent was coated on the polyethylene terephthalate film by bar-coating method so that an adhesive agent layer having a thickness of 20 μm was formed. Thereafter, the adhesive agent layer was laminated on the recording layer. An intermediate layer (adhesive agent layer) was formed by removing the releasable sheet.

(4) Formation of Cover Layer

A polycarbonate film (Panlite® film D-67 manufactured by TEIJIN CHEMICALS LTD.) having a thickness of 67 μm was laminated on the intermediate layer (adhesive agent layer) to form a cover layer.

Comparative Example 1

(1) Formation of First Intermediate Layer
(Recording Layer Support Layer)

A first intermediate layer (recording layer support layer) was formed by the same method as disclosed in the above Example 1.

(2) Formation of Recording Layer

The compound B and polybenzylmethacrylate (PBMA; manufactured by Sigma-Aldrich Co. LLC., Mw: 70,000) were dissolved in diethyl ketone with the mass ratio of 50:50, so that a coating liquid with a solid content concentration of 6 mass % was prepared. The coating liquid was applied onto the first intermediate layer by spin coating to form a recording layer having a thickness of 1 μm. The concentration of the compound B in the coating liquid was adjusted such that the light absorptance of the recording layer having a thickness of 1 μm became 8%.

(3) Formation of Second Intermediate Layer
(Adhesive Agent Layer)

A second intermediate layer (adhesive agent layer) was formed by the same method as disclosed in the above Example 1.

(4) Formation of Cover Layer

A cover layer was formed by the same method as disclosed in the above Example 1.

Example 2

(1) Formation of First Intermediate Layer
(Recording Layer Support Layer)

A first intermediate layer (recording layer support layer) was formed by the same method as disclosed in the above Example 1.

(2) Formation of Recording Layer

The compound C was diluted with PGMEA (propyleneglycol monomethylether acetate), so that a coating liquid with a solid content concentration of 13 mass % was prepared. The coating liquid was applied onto the first intermediate layer by spin coating to form a recording layer having a thickness of 1 µm. The concentration of the compound C in the coating liquid was adjusted such that the light absorptance of the recording layer having a thickness of 1 µm became 8%.

(3) Formation of Second Intermediate Layer
(Adhesive Agent Layer)

A second intermediate layer (adhesive agent layer) was formed by the same method as disclosed in the above Example 1.

(4) Formation of Cover Layer

A cover layer was formed by the same method as disclosed in the above Example 1.

Comparative Example 2

(1) Formation of First Intermediate Layer
(Recording Layer Support Layer)

A first intermediate layer (recording layer support layer) was formed by the same method as disclosed in the above Example 1.

(2) Formation of Recording Layer

The compound D and polybenzylmethacrylate (manufactured by Sigma-Aldrich Co. LLC., Mw: 70,000) were dissolved in methyl ethyl ketone with the mass ratio of 4:96, so that a coating liquid with a solid content concentration of 9 mass % was prepared. The coating liquid was applied onto the first intermediate layer by spin coating to form a recording layer having a thickness of 1 µm. The concentration of the compound D in the coating liquid was adjusted such that the light absorptance of the recording layer having a thickness of 1 µm became 8%.

(3) Formation of Second Intermediate Layer
(Adhesive Agent Layer)

A second intermediate layer (adhesive agent layer) was formed by the same method as disclosed in the above Example 1.

(4) Formation of Cover Layer

A cover layer was formed by the same method as disclosed in the above Example 1.

Comparative Example 3

(1) Formation of First Intermediate Layer
(Recording Layer Support Layer)

A first intermediate layer (recording layer support layer) was formed by the same method as disclosed in the above Example 1.

(2) Formation of Recording Layer

The compound E was diluted with PGMEA (propyleneglycol monomethylether acetate), so that a coating liquid with a solid content concentration of 13 wt % was prepared. The coating liquid was applied onto the first intermediate layer by spin coating to form a recording layer having a thickness of 1 µm. The concentration of the compound E in the coating liquid was adjusted such that the light absorptance of the recording layer having a thickness of 1 µm became 8%.

(3) Formation of Second Intermediate Layer
(Adhesive Agent Layer)

A second intermediate layer (adhesive agent layer) was formed by the same method as disclosed in the above Example 1.

(4) Formation of Cover Layer

A cover layer was formed by the same method as disclosed in the above Example 1.

Comparative Example 4

(1) Formation of First Intermediate Layer
(Recording Layer Support Layer)

A first intermediate layer (recording layer support layer) was formed by the same method as disclosed in the above Example 1.

(2) Formation of Recording Layer

The compound F and polybenzylmethacrylate (manufactured by Sigma-Aldrich Co. LLC., Mw: 70,000) were dissolved in methyl ethyl ketone with the mass ratio of 22:78, so that a coating liquid with a solid content concentration of 9 wt % was prepared. The coating liquid was applied onto the first intermediate layer by spin coating to form a recording layer having a thickness of 1 µm. The concentration of the compound F in the coating liquid was adjusted such that the light absorptance of the recording layer having a thickness of 1 µm became 8%.

(3) Formation of Second Intermediate Layer (Adhesive Agent Layer)

A second intermediate layer (adhesive agent layer) was formed by the same method as disclosed in the above Example 1.

(4) Formation of Cover Layer

A cover layer was formed by the same method as disclosed in the above Example 1.

<Evaluation of Characteristics>

(1) Evaluation on Absorptance of Recording Layer

The coating liquid, which was prepared in the process of the formation of the recording layer as described above and in which the recording material was dissolved in the solvent, was applied onto a quartz glass by spin coating to make a layer of 1 μm thickness. By this method, a sample in which a recording layer only was formed was prepared for each of the Examples and Comparative Examples. Thereafter, the absorbance of each sample (recording layer) at the wavelength of 405 nm was measured using a spectrophotometer (UV3100-PC manufactured by Shimadzu Corporation). Baseline was corrected by the measurement value of the quartz glass alone.

The light absorptance (%) was calculated from the obtained absorbance by the following formula.

Light absorptance=$(1-10^{-(Absorbance)}) \times 100$

As a result, the light absorptance of 8% was obtained in all the Examples and Comparative Examples.

(2) Evaluation on Coupling Strength Between Dye and Polymer Compound

For measuring the echo-peak shift, the second harmonic wave (400 nm, 60 fs, repetition frequency of 1 kHz) of the regenerative amplified beam of a titanium-sapphire laser was used as the excitation light. The generated pulsed beam was divided into three beams using a beam splitter; the three beams were caused to strike a concave mirror so as to form an equilateral triangle, and the time interval of the pulses was controlled by Linear Stage®. Echo signals (stimulated photon echo and virtual echo) generated from a sample in directions where the phase matching condition ($-k_1+K_2+k_3$, $k_1-k_2+k_3$) was satisfied were detected by two silicon photodiodes and added up using two lock-in amplifiers.

The echo-peak shift measurement was performed by the three-pulse photon echo measurement disclosed in the above Reference [1]. To be more specific, the signal intensities of the stimulated photon echo and the virtual echo were plotted against the interval between the first pulse and the second pulse (i.e., Coherent Time, τ) while fixing the time interval between the second pulse and the third pulse (i.e., Population Time, T). The time interval between the intensity peaks of the two echo signals was obtained, and one-half of the obtained value was plotted against T to perform the echo-peak shift measurement.

As a result, values of the coupling strengths were obtained for the respective samples as shown in FIG. 6. Although the same dye was used in Example 1 and Comparative Example 1, Example 1 in which the dye was bonded to the polymer compound showed a higher coupling strength than Comparative Example 1 in which the dye was dispersed in the polymer compound. Similarly, although the same dye was used in Example 2 and Comparative Example 2, Example 2 in which the dye was bonded to the polymer compound showed a higher coupling strength than Comparative Example 2 in which the dye was dispersed in the polymer compound.

In contrast, the same dye was used in Comparative Example 3 and Comparative Example 4; however, Comparative Example 3 in which the dye was bonded to the polymer compound and Comparative Example 4 in which the dye was dispersed in the polymer compound showed the same coupling strength.

(3) Evaluation on recording property

[Recording/Reading Evaluation Apparatus]

Recording and reading of the optical information recording media in Examples and Comparative Examples were performed using a system equivalent to an ordinal Blu-ray (BD) Disc pick-up optical system, and ODU-1000 (manufactured by Pulstec Industrial Co., Ltd.) was used as a control unit of an evaluation system comprising a spindle motor, a recording/reading laser, a light-sensitive element, and other parts. A semiconductor laser with a wavelength of 405 nm was used as a laser light source, and an objective lens with a numerical aperture (NA) of 0.85 was used as an objective lens, and the reflected beam from the recording layer was monitored to obtain a readout signal. Part of the reflected beam was introduced into the focus control light-sensitive element, and the position of the objective lens was controlled to perform a focus control.

Using the above recording/reading evaluation apparatus, the optical information recording media in Examples and Comparative Examples were subjected to recording by the following recording conditions, and thereafter the readout signals were obtained by the following reading conditions to evaluate CNR (Carrier-to-Noise Ratio). The laser power during the recording was adjusted so that the highest CNR was obtained.

Recording Conditions
Linear velocity 2 m/s
Pulse duration 50 ns
Frequency of pulsed laser beam 6.7 MHz
Read-Out Conditions
Linear velocity 2 m/s
Peak power of reading beam 1 mW As a result, as shown in FIG. 6, it was revealed that the optical information recording medium according to Example 1 required a smaller recording power for recording than the optical information recording medium according to Comparative Example 1; in Example 1, the coupling strength between the dye and the polymer compound is higher in the recording material because of the bonding of the dye to the polymer compound as compared with a recording material in which the dye is dispersed in the polymer compound. In other words, an improvement in sensitivity due to the bonding of the dye to the polymer compound could be observed. It was also revealed that the optical information recording medium according to Example 2 required a smaller recording power for recording than the optical information recording medium according to Comparative Example 2, and an improvement in sensitivity due to the bonding of the dye to the polymer compound could be observed.

In contrast, it was revealed that the optical information recording media according to Comparative Example 3 and Comparative Example 4 required the same recording power for recording, and an improvement in sensitivity due to the coupling of the dye and the polymer compound could not be observed.

(3) Evaluation of Storage Property

With respect to each of the optical information recording media according to Examples and Comparative Examples, the intensity of the reflected beam from the interface between the recording layer and the intermediate layer (adhesive agent layer) was measured. Thereafter, these optical information recording media were stored under conditions of 80° C. and 85% RH for 100 hours, and the intensity of the reflected beam from the interface between the recording layer and the intermediate layer (adhesive agent layer) was measured. The measurement of the reflected beam intensity was made using a multilayer film thickness measuring device SI-TS10 (manufactured by Keyence Corporation).

The results showed that in Examples 1 and 2 and Comparative Example 3, the intensity of the reflected beam after 100-hour storage was as high as 90% of the intensity of the reflected beam before storage and a change in the intensity of the reflected beam was small. This means that even if the optical information recording medium which includes a recording material comprising a dye bonded to a polymer compound is stored under conditions of high temperature and high humidity, the dye in the recording layer hardly spreads into the intermediate layer, so that excellent storage stability can be obtained. On the other hand, the results showed that in Comparative Examples 1, 2 and 4, the intensity of the reflected beam after 100-hour storage decreased to 50% or lower of the intensity of the reflected beam before storage and a change in the intensity of the reflected beam was great. This means that if the optical information recording medium which includes a recording material comprising a dye dispersed in a polymer compound is stored under conditions of high temperature and high humidity, the dye in the recording layer easily spreads into the intermediate layer, so that the readout signal degrades significantly due to a significant decrease in the intensity of the reflected beam at the interface.

As described above, it was revealed that the optical information recording media according to the present invention, in which the recording layer includes a recording material comprising a dye bonded to a polymer compound, were excellent in long-term stability.

What is claimed is:

1. An optical information recording medium comprising at least one recording layer,
    wherein the recording layer includes a recording material comprising a polymer compound to which a one-photon absorption dye is bonded, and
    wherein a coupling strength $\Delta^2$ between the one-photon absorption dye and the polymer compound in the recording material is higher than a coupling strength estimated to be exerted between the same one-photon absorption dye and the same polymer compound if the one-photon absorption dye is dispersed in the polymer compound in the recording material,
    wherein the number of atoms involved in bonding of the one-photon absorption dye to the polymer compound is less than 10.

2. The optical information recording medium according to claim 1, wherein an intermediate layer is provided between two adjacent recording layers.

3. The optical information recording medium according to claim 2, wherein each recording layer has a first interface and a second interface between the recording layer and two intermediate layers sandwiching the recording layer, and wherein at least one of the first and second interfaces is configured to have a protrusion formed by irradiation with a recording beam, the protrusion sticking out into one of the intermediate layers.

4. The optical information recording medium according to claim 3, wherein a thickness of the recording layer is equal to or greater than 50 nm.

5. The optical information recording medium according to claim 3, wherein the intermediate layer forming the interface in which the protrusion is formed is softer than the recording layer.

6. The optical information recording medium according to claim 3, wherein a glass transition temperature of the intermediate layer forming the interface in which the protrusion is formed is lower than a glass transition temperature of the recording layer.

7. The optical information recording medium according to claim 3, wherein the intermediate layer forming the interface in which the protrusion is formed is an adhesive agent layer.

8. The optical information recording medium according to claim 3, wherein the protrusion is formed in one of the first interface and the second interface by irradiation with the recording beam, and the protrusion is not formed in the other one of the first interface and the second interface, and
    wherein a difference between refractive indices of the intermediate layer and the recording layer is greater at the interface in which the protrusions is formed than at the interface in which the protrusion is not formed.

9. The optical information recording medium according to claim 8, wherein the difference between the refractive index of the intermediate layer forming the interface in which the protrusion is not formed and the refractive index of the recording layer is equal to or smaller than 0.05.

10. The optical information recording medium according to claim 1, wherein the recording material is a compound with the following chemical formula:

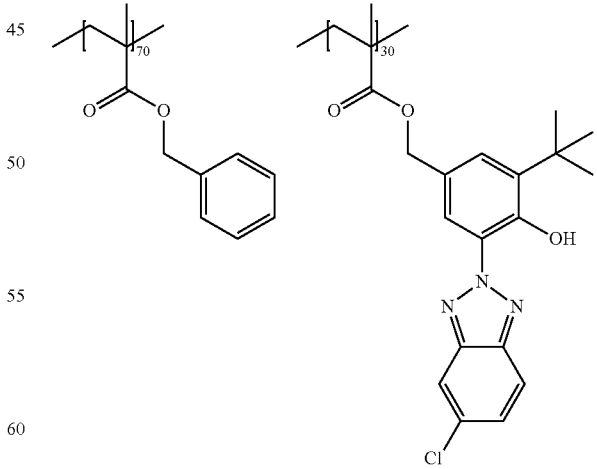

Compound A

11. The optical information recording medium according to claim 1, wherein the recording material is a compound with the following chemical formula:

Compound C
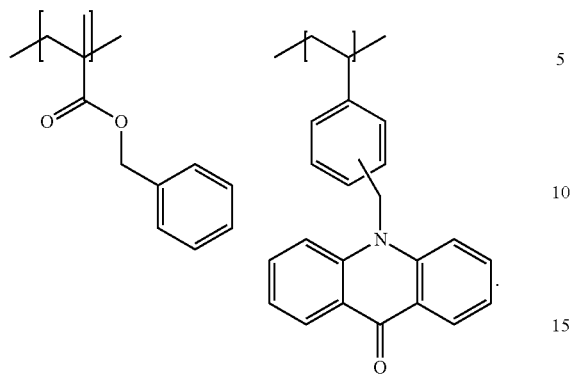
* * * * *